United States Patent Office 3,415,688
Patented Dec. 10, 1968

3,415,688
ALUMINUM CELL
Jean Foucry, Montlhery, France, assignor to Compagnie Generale d'Electricite, Paris, France, a corporation of France
No Drawing. Filed Apr. 28, 1966, Ser. No. 545,826
Claims priority, application France, Apr. 28, 1965, 14,995; June 11, 1965, 20,559
10 Claims. (Cl. 136—100)

ABSTRACT OF THE DISCLOSURE

An electrochemical cell comprising an aluminum anode, a cathode and an aqueous acidic electrolyte which contains therein a complexing agent to inhibit the formation of an oxide layer on the surface of the anode. Suitable complexing agents include the salts of EDTA, salts of ethanolamine, and the salts formed by neutralizing fluoboric acid or hydrofluoric acid with an organic base, for example, an amine. Preferably, the electrolyte also contains ammonium chloride and/or mercuric chloride.

---

This invention relates to an electrical cell. More particularly, the invention is directed to an electrochemical device containing an aluminum anode.

Electrochemical cells containing zinc anodes are well known in the art. However, it woud be advantageous to replace the zinc anode of known electrochemical devices by an aluminum anode, because aluminum can produce more potential, is trivalent rather than divalent and has a smaller molecular weight. As to the latter, for example, a 27-gram aluminum electrode would replace a 95-gram zinc electrode.

However, to date, aluminum has not yet been used in this manner because during an electrochemical process therewith an alumina (aluminum oxide) coating is formed on the aluminum electrode. This coating inactivates the anode, which causes a considerable drop in the discharge after a certain amount of usage. One possible solution to this problem is to use a very strong acid as an electrolyte therewith, but then the anode would be consumed when the circuits of the cell are open and such a consumption could not be controlled.

The present invention remedies this inconvenience and disadvantage and thus makes possible in a practical manner a cell containing an aluminum anode.

In accordance with the present invention, a consumable aluminum electrode cell is provided which contains an aqueous acid medium that serves both as an electrolyte and as an aluminum oxide complexing agent. The medium is active enough to dissolve the aluminum oxide when the cell is in closed circuit and inactive enough to permit the coating of aluminum oxide to form when the cell is in open circuit.

The aqueous acid medium described above that comprises the basic electrolyte of the present invention must have a good ionic conductivity in order to avoid large ohmic drops. This electrolyte medium can be, for example, a solution of ammonium chloride or of a salt of a strong acid with ethanolamine. The medium can also contain a certain quantity of mercuric chloride, which acts as an accelerator of electrochemical reactions.

According to a particularly advantageous embodiment of the present invention, the aqueous medium electrolyte is a mixture of the three components set forth above. In this medium, the ammonium chloride is the basic electrolyte, the mercuric chloride is the accelerator and the salt of monoethanolamine acts as both the basic electrolyte and as the complexing agent.

More particularly, in a cell according to the present invention, it has been found that the following complexing agents are of particular advantage:

Salts of ethylenediamine tetraacetic acid.
Salts of a strong acid with ethanolamine or the complex fluoride derivatives of organic amines and, in particular, the salts formed by the neutralization of fluoboric acid with an organic base.
Salts formed by the neutralization of hydrofluoric acid with an amine.

By way of nonlimiting examples, the organic bases mentioned above can be aliphatic amines such as monoethylamine and ethylenediamine, aminoalcohols such as ethanolamine, aromatic amines such as pyridine and the like.

The complex fluoride derivatives of organic amines and in particular the fluoborides of aluminum and amines or aminoalcohols are much more soluble than the fluorides of aluminum or the double fluorides of aluminum and ammonium.

The use of a solution formed by the neutralization of hydrofluoric acid (40% solution thereof, for example), with an amine (monoethylamine, for example) as a complexing agent gives results analogous to those obtained by the use of a solution formed by the neutralization of fluoboric acid with an amine.

However, it is interesting to note that the use of a hydrofluoric acid compound is more advantageous than that of a fluoboric acid compound, because the molecular weight of hydrofluoric acid is low compared to the molecular weight of fluoboric acid.

The cathode of the cell according to the present invention may be composed of any of the reducible oxides, such as CuO for example, or of a mineral or an organic peroxide, such as $PbO_2$, $MnO_2$, $Co_2O_3$, benzoyl peroxide, etc.

As an illustration, the results of several measurements taken with an electrochemical cell according to the present invention are shown hereinbelow:

The following examples are given merely as illustrative of the present invention and are not to be considered as limiting. In these examples, the anode is a pure aluminum cylindrical cup, 14 millimeters in diameter (weight 3 grams), while the cathode is a small rod made of very porous graphite, having a cross section of 5 mm.$^2$ (weight 15 grams) which has been charged with $PbO_2$ deposited by electrolysis. The cathode is sealed on the bottom of the anode cup by paraffin. The useful length of the electrodes is about 7 centimeters.

EXAMPLE I

An electrolyte is made of—
Complexing agent: 50 cc. of monoethanolamine chloride, a solution of 600 grams per liter;
Basic electrolyte: 50 cc. of $NH_4Cl$, a solution of 300 grams per liter; and
Accelerator: 1 cc. of mercuric chloride, a solution of 1 gram per liter.
The E.M.F. in the open circuit is 2.25 volts.
With a resistance of 10 ohms, there is obtained:

at the beginning of electrolysis—170 ma. with 1.90 volts
after one hour—160 ma. with 1.75 volts
after 14 hours—100 ma. with 1.20 volts.

As is mentioned above, the complexing agent can also be, for example, a salt formed by the neutralization of fluoboric acid or hydrofluoric acid with an organic base such as an amine, for example, ethanolamine, monoethylamine, ethylenediamine, etc., as well as pyridine, whereby analogous results would be obtained.

In the case of a complexing agent formed by the neutralization of fluoboric acid with an amine RN, the following reaction occurs in the presence of aluminum and oxygen:

$$2Al + 3O + 6RNHBF_4 \rightarrow 2Al(BF_4)_3 \cdot 6NR + 3H_2O$$

The aluminum fluoborate $Al(BF_4)_3$ is soluble even in the presence of an excess of amine.

In the case of a complexing agent formed by the neutralization of hydrofluoric acid with an amine RN, the following reaction occurs in the presence of aluminum and oxygen:

$$2Al + 3O + 6RNHF \rightarrow 2AlF_3 \cdot 3NR + 3H_2O$$

These reactions are to be compared with that occurring in a Leclanche type cell:

$$Zn + O + 2NH_4Cl \rightarrow ZnCl_2 \cdot (NH_3)_2 + H_2O$$

$ZnCl_2 \cdot (NH_3)_2$ being a soluble complex.

Thus, for example, a mixture of the complexing agent of the present invention and ammonium chloride may be employed as the electrolyte.

The following examples illustrate some measurements made on a cell wherein the complexing agent is a salt formed by the neutralization of fluoboric acid.

EXAMPLE II

Under the same conditions described in Example I, the following electrolyte is employed—

Basic electrolyte: 50 cc. of $NH_4Cl$, a solution of 300 grams per liter;

Complexing agent: 50 cc. of a solution obtained by neutralizing a 32% solution of fluoboric acid with pyridine until the yellow of methyl orange indicator is obtained, the pH being adjusted to about 4.

With a 1.58-ohm resistance, there is obtained:

at the beginning of electrolysis—810 ma. with 1.5 volts
after 30 minutes—750 ma. with 1.4 volts

EXAMPLE III

The following electrolyte is used:

50 cc. of $NH_4Cl$, a solution of 300 grams per liter;
50 cc. of a solution obtained by neutralizing a 32% solution onf fluoboric acid with ethylenediamine until a pH of about 4 is reached.

With a resistance of 1.58 ohms, there is obtained:

at the beginning of electrolysis—910 ma. with 1.76 volts
after 10 minutes—860 ma. with 1.60 volts
after 1 hour—850 ma. wth 1.58 volts The aluminum anode cells of the present invention have a very specific potential curve. The E.M.F. reaches a minimum in open circuit a few minutes after stopping. In discharge, to the contrary, the potential increases with time for a few minutes and then stabilizes. These phenomena mark the formation, in closed circuit, then the disappearance, in open circuit, of an inactivating coating. The complexing agents used can either dissolve the entire aluminum oxide coating formed or only a part thereof, which suffices to avoid the adherence of the alumina on the aluminum.

It is evident that the electrolyte used will produce a discharge as large as the speed of complex formation and that the performance will be greater the higher the conductivity.

It should be noted that it is also possible to utilize a cell similar to that described hereinabove, but which does not contain the basic electrolyte mentioned above. The complexing agent then acts, at the same time, as the basic electrolyte. However, this latter solution is less advantageous because of the lower conductivity of the complexing agent, which slightly diminishes the discharge of the cell.

The invention being thus described, it will be obvious that the same may be varied in many ways. Such variations are not to be regarded as a departure from the spirit and scope of the invention and all such modifications are intended to be included within the scope of the following claims.

I claim:
1. An electrochemical cell comprising an aluminum anode, a cathode and an aqueous acidic electrolyte, said electrolyte including a complexing agent which inhibits the formation of an oxide layer, which would block the passage of electrons, on the surface of said anode, said complexing agent being selected from the group consisting of the salts of ethylenediaminetetraacetic acid, the salts of a strong acid with ethanolamine, the salts formed by the neutralization of fluoboric acid with an organic base and the salts formed by the neutralization of hydrofluoric acid with an amine.

2. An electrochemical cell according to claim 1, in which said organic base is an amine.

3. An electrochemical cell according to claim 2, in which said amine is selected from the group consisting of ethanolamine, monoethylamine, ethylenediamine and pyridine.

4. An electrochemical cell according to claim 1, in which said electrolyte also contains ammonium chloride.

5. An electrochemical cell according to claim 1, in which said electrolyte also contains mercuric chloride.

6. An electrochemical cell according to claim 1, in which said electrolyte contains ammonium chloride and mercuric chloride and said complexing agent is monoethanolamine chloride.

7. An electrochemical cell according to claim 1, in which said electrolyte contains fluoboric acid.

8. An electrochemical cell according to claim 7, in which the pH of the electrolyte is adjusted to about 4.

9. An electrochemical cell according to claim 1, in which the cathode of the cell is at least partially made with a compound selected from the group consisting of cupric oxide, the mineral peroxides, the organic peroxides and mixtures thereof.

10. An electrochemical cell according to claim 7, in which said cathode is graphite.

References Cited

UNITED STATES PATENTS

| | | | |
|---|---|---|---|
| 2,843,510 | 7/1958 | McGraw | 136—155 |
| 2,950,999 | 8/1960 | Craig et al. | 136—155 |
| 3,043,896 | 7/1962 | Herbert et al. | 136—6 |
| 3,117,032 | 1/1964 | Panzer | 136—100 |
| 3,185,590 | 5/1965 | Mayer et al. | 136—6 |
| 3,248,265 | 4/1966 | Herbert | 136—100 |

WINSTON A. DOUGLAS, Primary Examiner.

C. F. LE FEVOUR, Assistant Examiner.

U.S. Cl. X.R.

136—155; 204—58